United States Patent Office 3,698,986
Patented Oct. 17, 1972

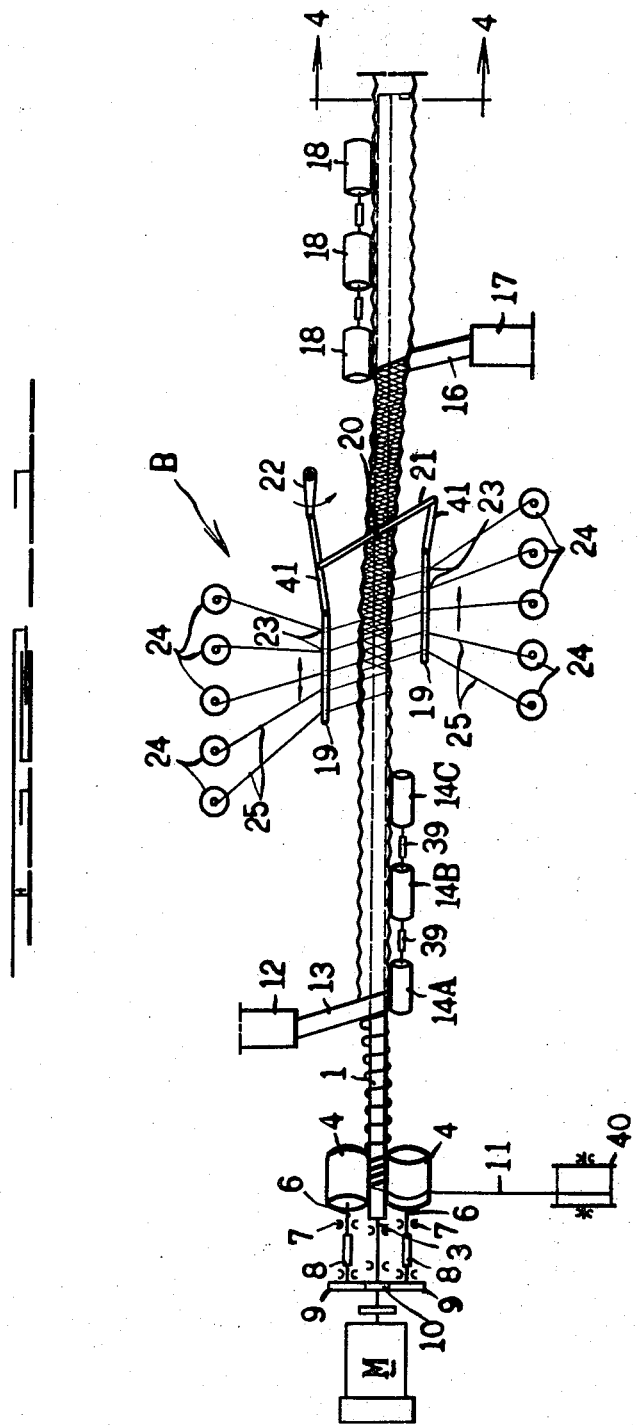

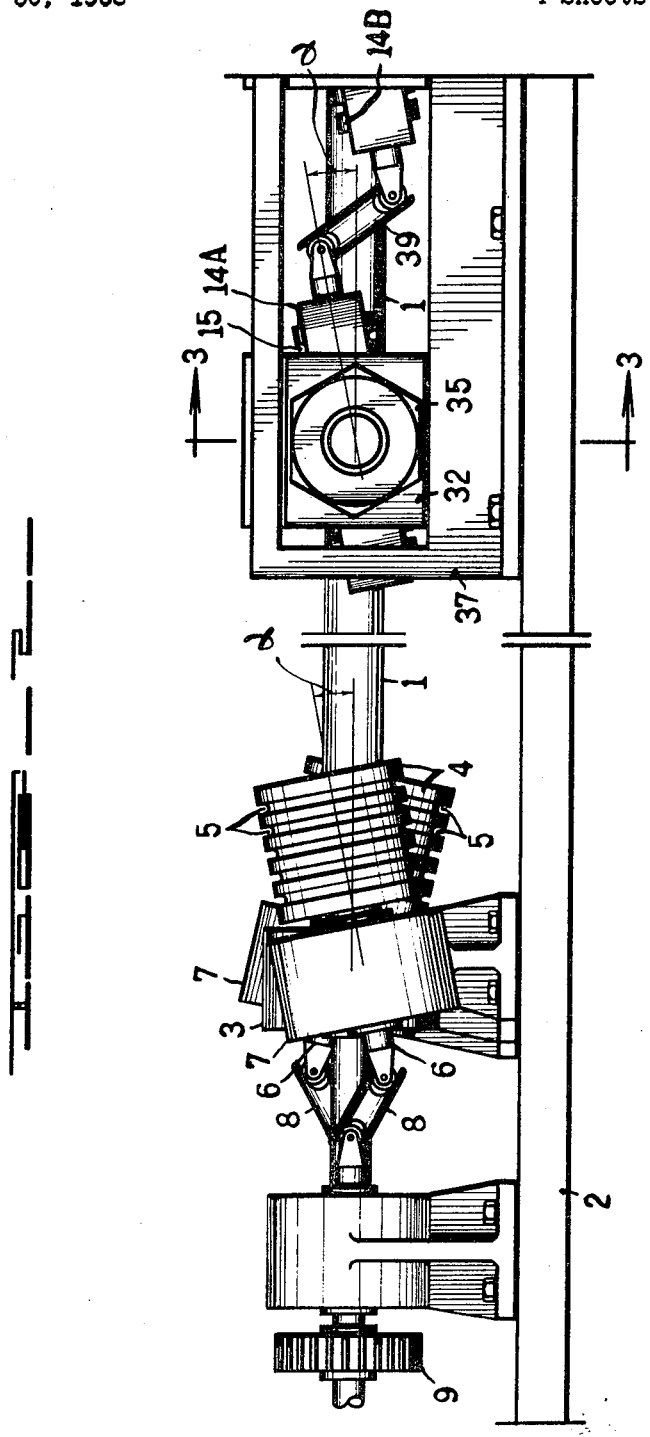

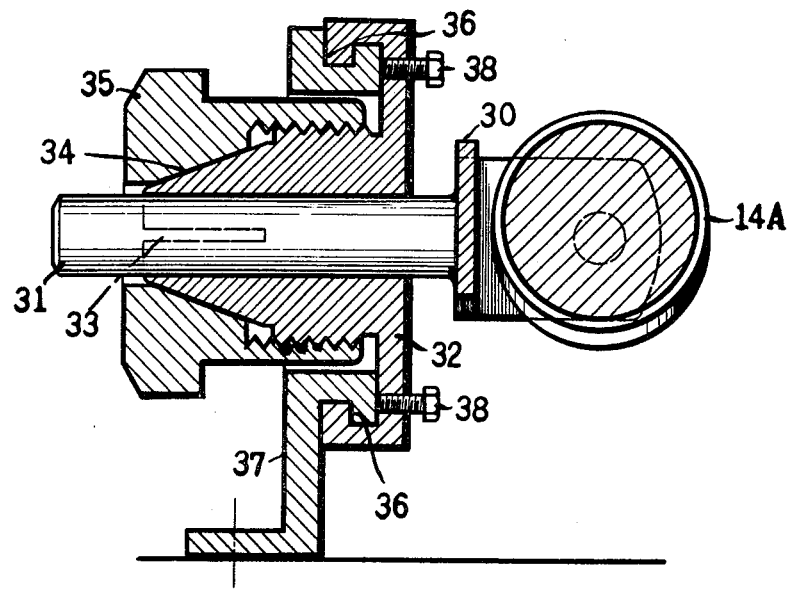
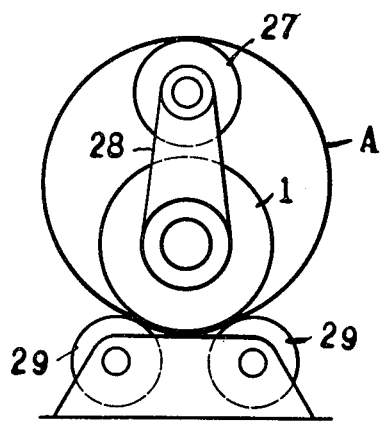

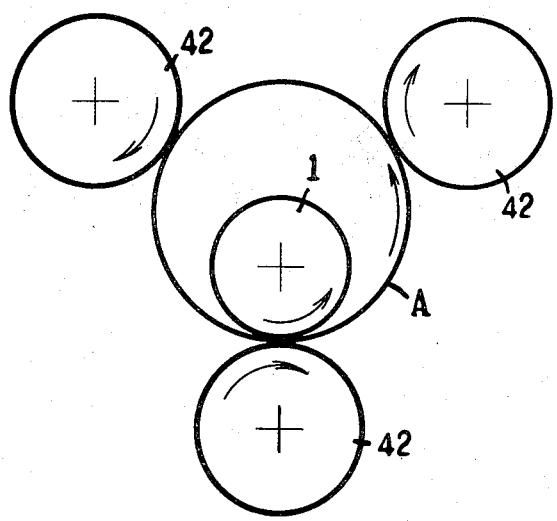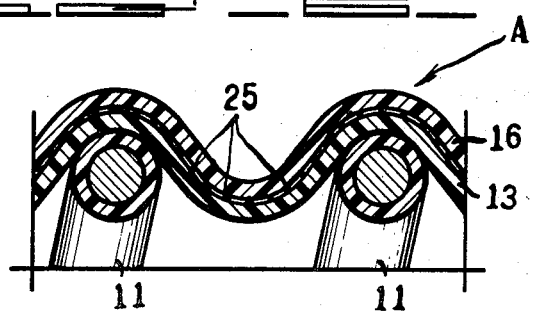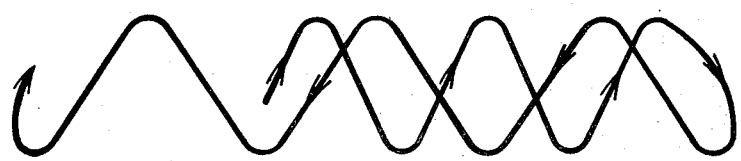

3,698,986
APPARATUS FOR MANUFACTURING HOSE
Akira Okmura, 7-2 Sawaragi-cho, Takatsuki,
Osaka, Japan
Original application Oct. 30, 1968, Ser. No. 771,928, now Patent No. 3,607,501, dated Sept. 21, 1971. Divided and this application July 13, 1970, Ser. No. 54,516
Int. Cl. B32b 31/30; B31c 13/00; B65b 81/06
U.S. Cl. 156—393                                            2 Claims

ABSTRACT OF THE DISCLOSURE

An apparatus for manufacturing a hose free of internal stress but having high flexibility by continuously winding a synthetic resin strip extruded from an extruder in half-molten state around a spiral member on a rotary shaft which has fully been restored by the resiliency of its own to the natural condition after having been spirally wound on the shaft.

RELATED APPLICATION

This application is a divisional of my co-pending application entitled "Method and Apparatus for Manufacturing Hose," Ser. No. 771,928, filed Oct. 30, 1968, now U.S. Pat. No. 3,607,501.

The present invention relates to an apparatus for manufacturing a hose made of a thermoplastic synthetic resin and having a spiral reinforcing core member therein.

As a method for producing a hose of this type available at present already known is a method in which a hose is made by spirally winding a core member like a piano wire on a length of a rotating shaft and further winding a synthetic resin strip extruded from an extruder around the spiral member. In this case, however, since the strip is wound around the external surface of the piano wire serving as a core member which has been wound around the rotary shaft in snag-fit contact therewith, there remains as an internal stress of the hose the resiliency of the spirally wound core member, namely a restoring force to return the spiral member to a natural position, so that the strength of the matrix of the hose should be such that the internal stress is fully taken into consideration and, due to the internal stress, the service life of the hose becomes inevitably shorter with the flexibility of the hose matrix impaired. In view of the above-mentioned defects, another method has been proposed in which a hose is formed by providing a spiral member which has been fully restored to sufficiently natural condition and winding a strip around the circumferential surface of the spiral member. This method, however, requires two steps in manufacturing hoses and a large length of hose cannot be obtained continuously by this method.

Accordingly, a principal object of the present invention is to entirely eliminate the above disadvantages and to provide a method and apparatus for continuously manufacturing in one step a synthetic resin hose having a spiral reinforcing core member and free of internal stress but provided with high flexibility.

More particularly, a principal object of the present invention is to provide a method and apparatus for continuously manufacturing the above-mentioned hose free of internal stress but having high flexiibility by continuously winding a synthetic resin strip extruded from an extruder in half-molten state around a spiral member which has been fully restored by the resiliency of its own to a natural condition after having been spirally wound in hose manufacturing procedure.

Another object of the present invention is to provide a string feeding device having a simple structure and capable of effectively winding many pieces of reinforcing string in intersecting manner around the outer circumferential surface of the hose so as to obtain the above described hose having high strength and abrasion resistance.

Other objects and advantages of the present invention will be readily understood from the following detailed description with reference to the drawings given by way of example, in which:

FIG. 1 is a schematic plan view showing an apparatus in accordance with the present invention;

FIG. 2 is a side elevation on an enlarged scale showing the principal parts of the apparatus of the present invention;

FIG. 3 is a view in section taken along the line 3—3 in FIG. 2;

FIG. 4 is a view in section taken along the line 4—4 in FIG. 1;

FIG. 5 is a schematic front view showing an example of the arrangement of guide rollers in the apparatus of the present invention;

FIG. 6 is an enlarged view in section showing part of hose manufactured by the apparatus of the present invention; and FIG. 7 is a graphic diagram showing the trace of string to be wound around a hose by a string feeding device in the apparatus of the present invention.

The present invention will now be described with reference to FIGS. 1 and 2. Disposed on a stationary frame 2 is a long rotary shaft 1 which is rotatably supported on a bearing 3 at its one end and adapted to be driven by a motor M. On opposite sides of the base portion of the rotary shaft 1 is mounted a pair of feed rollers 4 and 4 to be driven in a direction opposite to that of the rotary shaft 1. As already shown in FIG. 2, each of the feed rollers 4 is inclined at an angle of inclination with respect to the tangential direction of the rotary shaft 1 and provided with suitably spaced annular guide grooves 5 in the circumferential surface thereof. An axis 6 of each of the feed rollers is supported on a bearing 7. By means of a universal joint 8 the axis 6 is operatively connected to a gear 9, which is further joined with a gear 10, having a smaller diameter coaxially fixed to the rotary shaft 1. Accordingly, by driving the motor M the rotary shaft 1 and a pair of feed rollers 4 adapted to be driven in a direction opposite to that of the rotary shaft can be simultaneously rotated. Furthermore, the proportion of the diameter between the gears 9 and the gear 10 on the rotary shaft 1 is so predetermined that the circumferential speeds of the feed rollers 4 and rotary shaft 1 may be the same when they are driven.

In the above apparatus, when a core member 11 which is a piano wire or a piano wire coated with synthetic resin is fed between one feed roller 4 and the rotary shaft 1 from a reel 40, the core member 11, while being spirally wound around the rotary shaft 1, is sent rightward in the drawing due to the effect of the inclination of the aforementioned feed rollers. And immediately upon leaving the feed rollers 4, the spiral member is restored to natural condition due to the resiliency of the material itself, the diameter of the spiral member thereby being enlarged. As illustrated in FIG. 1, around this spiral member is now wound a strip 13 made of synthetic resin and extruded in half-molten state from an extruder 12 with one edge portion thereof overlapped with the other. Indicated as at 14A, 14B and 14C in the drawing are guide rollers which afford assistance to winding operation of strip 13 and serve to continuously move the wound-up hose toward the right. Like the feed rollers, each of the guide rollers is provided with a predetermined inclination angle and annular guide grooves 15 (see FIG. 2) and adapted to be driven by a suitable power source at the same circumferential speed as the rotary shaft 1 but in an opposite direction. Each of the guide rollers is connected to one another by means of a universal joint 39.

It will be readily understood that the strip 13, when fed between the guide roller 14A and the spiral member with the edge portions overlapped, may be continuously spirally wound around the spiral member while the overlapping edge portions being pressed and joined together by the roller 14A.

At this time, since the rotary shaft 1 has the same circumferential speed as the spiral member, the spiral member, even if it is pressed into contact with a portion of the circumferential surface of the rotary shaft 1, may be rotated at the same circumferential speed as the shaft without giving rise to any abrasion or other troubles therebetween.

Further, in accordance with an embodiment of the present invention illustrated in the drawings, there are provided a string feeding device B for winding in intersecting manner a number of pieces of string around the outer circumferential surface of the hose thus obtained to enhance the strength, an extruder 17 for further winding a strip 16 on the outer circumferential surface of the hose which has been given a winding operation by the device B, and guide rollers 18 having a structure similar to guide rollers 14A to 14C. The string feeding device B includes a pair of sliding members 19 adapted for a linear reciprocating movement in the axial direction of the rotary shaft, the sliding members 19 being respectively connected through links 41 to the opposite ends of a pivotal rod 21 adapted to be pivotally moved on a supporting point 20. The pivotal rod 21 is so adapted as to be pivotally moved by the rotation of a crank 22. Accordingly, the both of the sliding members 19 can be brought into an alternate reciprocating movement by rotating the crank 22. Furthermore, each of the sliding member 19 is provided with a number of string feeding openings 23 which are suitably spaced apart and through which pieces of string 25 are fed from respective bobbins 24 onto the circumferential surface of the hose which is being sent forward while rotating. It will be readily understood, therefore, that the string can be wound around the circumferential surface of the hose in crossing manner. In this case each piece of the string 25, while being reciprocated along the axis of the hose, is fed onto the circumferential surface of the hose which is advanced while being rotating, so that a piece of string to be wound around the surface of the hose shows, as it advances, a trace having a small pitch as illustrated in FIG. 7 while the sliding member 19 moves in the same direction as the advancing hose, whereas when the sliding member moves in the direction opposite to the advancing direction of the hose, the string moves backwards to a large extent, leaving a trace with a large pitch. Thus, a piece of string can be wound around the circumferential surface of the hose continuously and in crossing pattern, and by winding a number of pieces of string around the outer surface of the hose in the same manner, a hose having high strength can be obtained.

By spirally winding by the same means as the above-mentioned a strip 16 extruded from the extruder 17 once again over the circumferential surface of the hose having a number of pieces of string thus wound thereon in crossing manner, a flexible nose A made of synthetic resin and having an internal reinforcing core member 11 and reinforcing string 25 wound in crossing pattern as shown in FIG. 6 can be manufactured continuously.

In this case, since the spiral reinforcing core member 11 has fully been restored to the natural condition before the strip 13 is wound, the internal stress of the hose attributable to the resiliency of this reinforcing core member can be perfectly eliminated, which enables to obtain a highly flexible and durable hose in one step of continuous operation.

In order to preclude the deflection of the hose finally obtained, there is provided at the terminal end of the rotary shaft 1 an auxiliary roller 27 for filling the space between the rotary shaft 1 and the finished hose A, the roller 27 being supported on an arm 28 held by the rotary shaft 1 as shown in FIG. 4. Also shown in the same drawing is a pair of receiving rollers 29 and 29 dispersed beneath the terminal end of the rotary shaft 1 for supporting the rotary shaft 1 and the finished hose A, the rotary shaft, long as it is, thereby being prevented from drooping by its own weight.

For the adjustment of the inclination angle and the clearance between the guide rollers and rotary shaft, the guide rollers have the following structure.

In order to simplify the explanation, the description will be given with respect to one of the guide rollers with referance to FIGS. 2 and 3. A frame 30 supporting the guide roller 14A is provided, at the rear portion, with a mounting axis 31 extending at a right angle with the rotary shaft 1, which is supported on a receiving member 32 adapted to be laterally moved. The rear portion of the receiving member 32 has a tapering portion 34 having a slitted groove 33 along the axial direction of the axis 31. Screwed onto the receiving member 32 is a clamping nut 35 in snag-fit contact with the tapering portion. By loosening this clamping nut 45, the axis 31 can be released from connection with the receiving member 32, and accordingly, the inclination angle of the guide roller 14A and the clearance between the guide roller and the rotary shaft 1 can be adjusted by turning or axially moving the axis 31. In addition, the receiving member 32 is supported on the stationary base 37 by means of dovetail grooves 36 with bolts 38 securing the member to the base. By loosening these bolts the receiving member 32 can be moved laterally, i.e., in the axial direction of the rotary shaft 1, when so desired. Thus the position of the guide roller can readily be altered.

Although the present invention has been described in detail with respect to an embodiment, it should be understood that the invention is not limited only to such embodiment but it may also reside in all of the alterations, modifications and equivalents, within the scope of the appended claims and the spirit of the inventor. As shown in FIG. 5, for instance, plural guide rollers 42 corresponding to the guide rollers 14 and 18 shown in the embodiment may be disposed in suitably spaced relationship on the circumferential surface of the hose A to be manufactured in order to prevent the deflection of the hose A.

I claim:

1. An apparatus for manufacturing a hose made of synthetic resin and having a spiral reinforcing core member therein comprising a long rotary shaft, at least one feed roller disposed in proximity with the circumferential surface at one end of said rotary shaft and adapted to be driven at the same circumferential speed as said rotary shaft in the opposite direction for feeding a core member around the rotary shaft as the rotary shaft rotates whereby the core member is spirally wound about the rotary shaft, an extruder provided on one side of said rotary shaft and spaced from said feed roller for extruding a synthetic resin strip about the spirally wound core member, and at least one guide roller arranged in proximity with said extruder and beside said rotary shaft and adapted to be driven at the same circumferential speed as said rotary shaft in the opposite direction for guiding the winding of the synthetic resin strip about the core member and for advancing the wound resin strip and core member along the rotary shaft, said feed roller and guide roller being inclined at a predetermined inclination angle with respect to the tangential direction of said rotary shaft, a string feeding device provided beside said rotary shaft forwardly of the extruder in the direction in which the wound resin strip and core member are advanced, said string feeding device having a pair of sliding members disposed on opposite sides of said rotary shaft and adapted for alternate linear reciprocating movement along the axial direction of said rotary shaft, each of said sliding members being provided with a number of suitable spaced apart string feeding openings through which string is wound around the circumferential surface of the wound resin strip in a crossing manner.

2. The apparatus of claim 1 wherein each of said guide rollers is supported on a frame having a mounting axis extending at a right angle with said rotary shaft, said mounting axis being supported within a concentric receiving member, said receiving member being provided with a tapering surface having a slitted groove along the axial direction of said mounting axis, a clamping nut in snug-fit contact with the tapering surface being screwed onto said receiving member, said nut being adapted for loosening said receiving member and releasing said mounting axis for movement within the receiving member whereby the inclination angle of each guide roller and the clearance between each guide roller and said rotary shaft may be adjusted.

References Cited
UNITED STATES PATENTS

| | | | |
|---|---|---|---|
| 2,524,679 | 10/1950 | Roberts | 156—187 |
| 2,722,263 | 11/1955 | Beare et al. | 156—195 |
| 2,759,521 | 8/1956 | Hall et al. | 156—429 |
| 2,810,424 | 10/1957 | Swartswelter | 156—172 |
| 3,287,194 | 11/1966 | Waddell, Jr. | 156—149 |
| 3,548,724 | 12/1970 | Hall | 156—195 |

DANIEL J. FRITSCH, Primary Examiner

U.S. Cl. X.R.

57—13; 87—6, 9; 138—131; 156—149, 429, 432, 436, 440, 446, 459, 500